Figure 1:
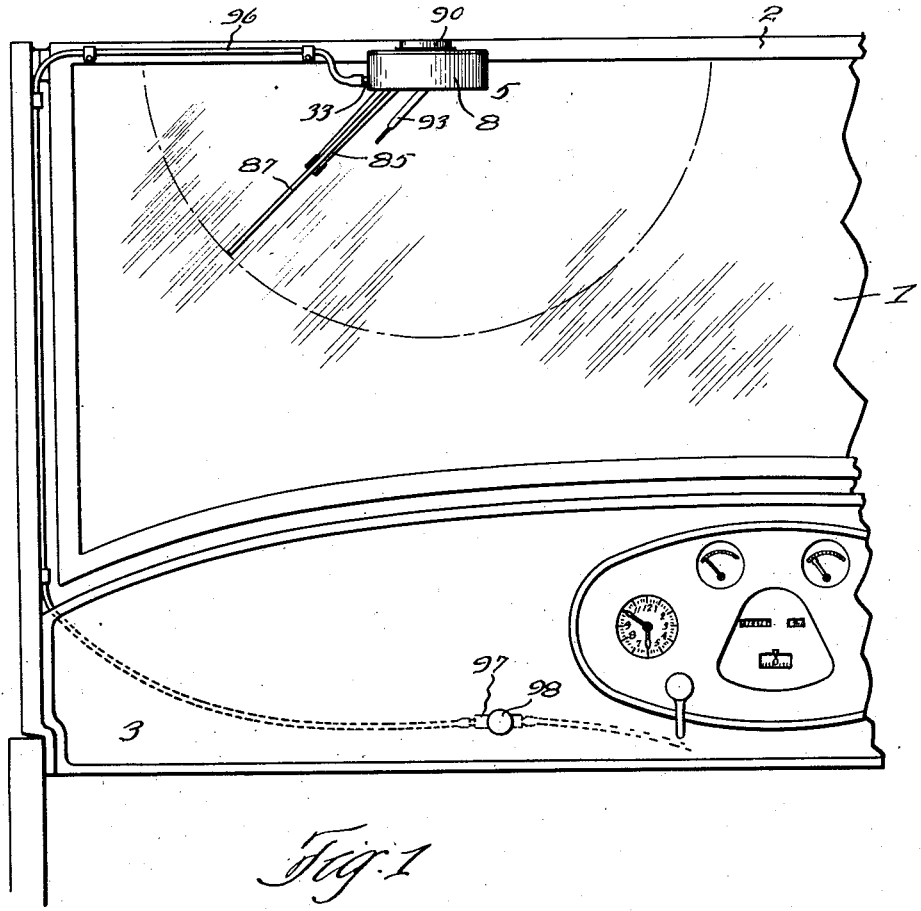

April 12, 1927.

S. LIPPERT 1,624,264

MOTOR DRIVEN WINDSHIELD CLEANER

Filed Nov. 26, 1923   4 Sheets-Sheet 1

Inventor
Samuel Lippert.
By Hull, Brock & West
Attys.

April 12, 1927.  
S. LIPPERT  
1,624,264  
MOTOR DRIVEN WINDSHIELD CLEANER  
Filed Nov. 26, 1923 4 Sheets-Sheet 2

Inventor  
Samuel Lippert  
By Hull, Brock & West  
Attys.

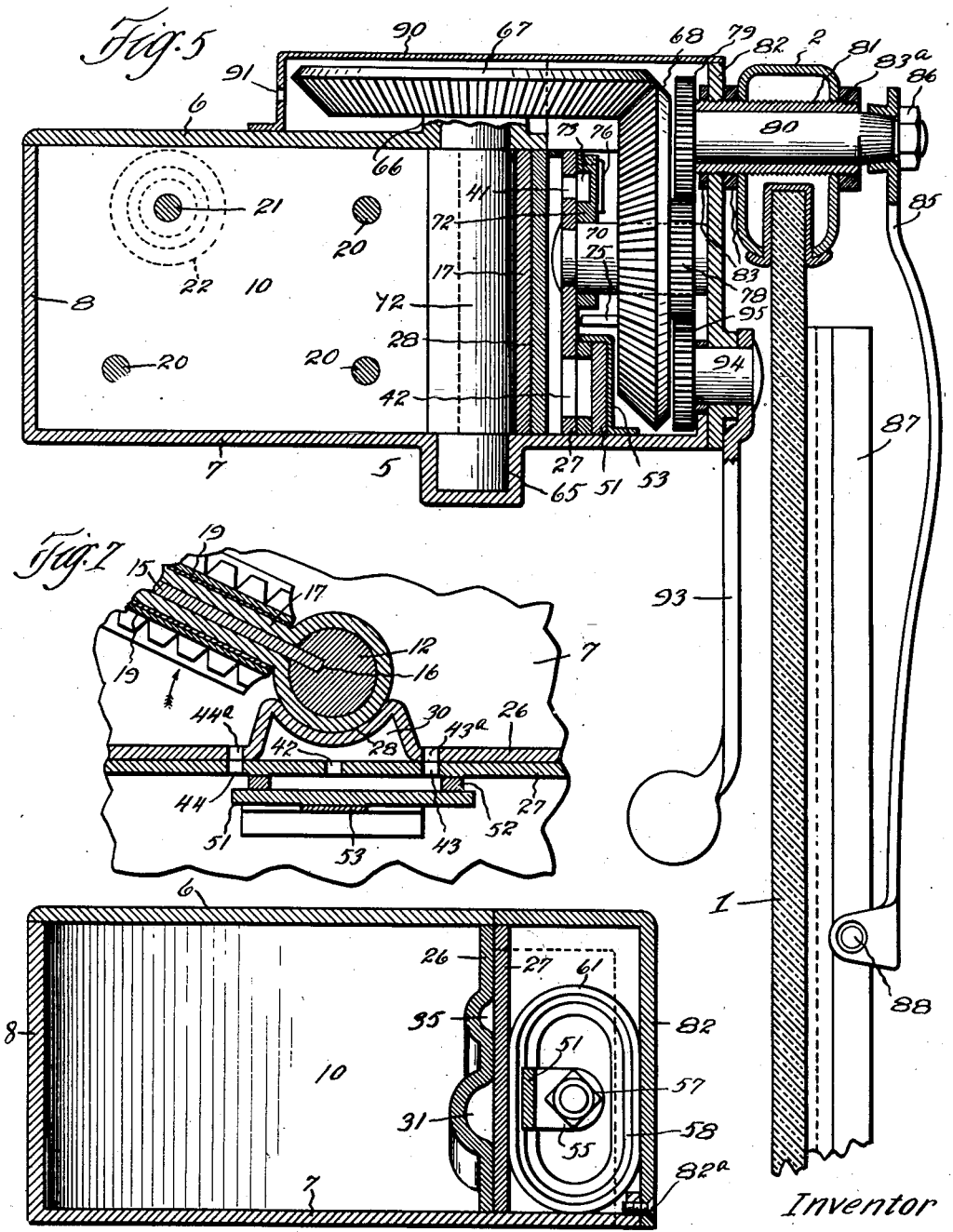

April 12, 1927.                    S. LIPPERT                    1,624,264
                          MOTOR DRIVEN WINDSHIELD CLEANER
                     Filed Nov. 26, 1923      4 Sheets-Sheet 4
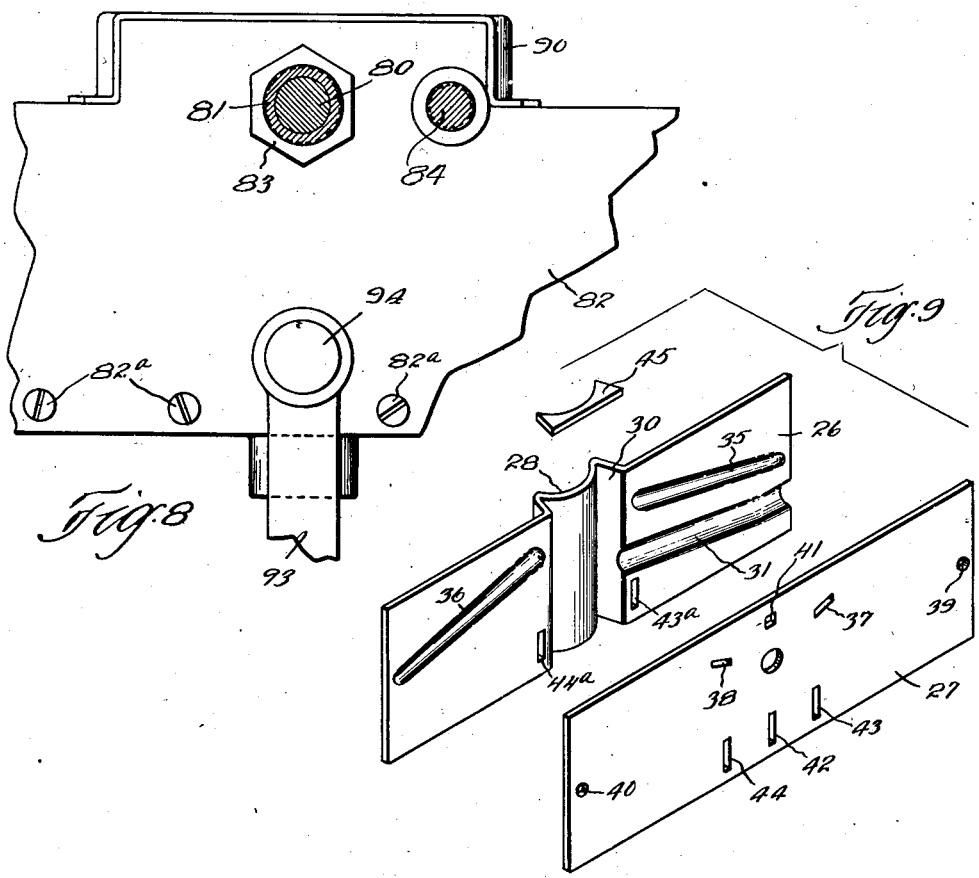
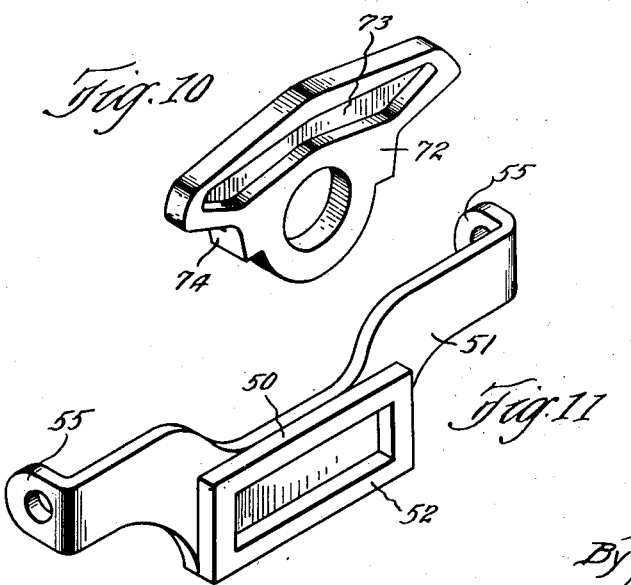
Inventor
Samuel Lippert
By Hull, Brock & West
Attys.

Patented Apr. 12, 1927.

1,624,264

UNITED STATES PATENT OFFICE.

SAMUEL LIPPERT, OF GARFIELD HEIGHTS, OHIO, ASSIGNOR TO THE OUTLOOK COMPANY, OF CLEVELAND, OHIO, A CORPORATION OF OHIO.

MOTOR-DRIVEN WINDSHIELD CLEANER.

Application filed November 26, 1923. Serial No. 676,971.

This invention, while relating generally to the class of windshield cleaners, has to do particularly with an improved motor for use in automatic or power driven apparatus of the aforesaid class, and yet more especially where the same is so-called "suction" operated.

There are many cleaners of this general type now in use, some employing motors incorporating opposed cylinders, others incorporating diaphragms, and still others which are of the well-known oscillatory type, each kind involving valve mechanism which has to be moved to its opposite extreme position by means of a spring, as otherwise the motor would stop on "dead center," so to speak, a situation well understood by those familiar with this sort of apparatus.

It is an object of my invention to provide a pressure fluid motor—or suction motor, as it may be termed—wherein the valve mechanism is positively moved from either of its extreme positions to the other by the actuating medium of the motor and entirely independently of any mechanical connections between the driven element or prime mover of the motor and the valve mechanism and which, by virtue of this, eliminates the so-called "dead center" condition, at the same time obviating the need of actuating springs which too frequently lead to annoyance and trouble.

The oscillating type of motor, because of its simplicity and reliability (if properly constructed), is generally conceded to be preferable to the opposed cylinder or diaphragm types but as heretofore constructed, it has proved to be somewhat difficult and expensive of manufacture, and more or less objectionable on account of the amount of area of the windshield it covers, the same being located necessarily directly in front of the driver.

Another object of my invention is to so construct the motor and so arrange the power transmitting mechanism between the prime mover and the cleaner or wiper that the motor occupies the minimum amount of area of the windshield while yet the shaft which carries the cleaner or wiper is located very close to the top of the casing to facilitate installation in vehicles especially the enclosed type where the tops are comparatively low.

Another and very important object of my invention is the production of a motor of the class in question that is constructed practically entirely of die stamped sheet metal parts, thus greatly expediting and cheapening manufacture, insuring uniformity of product and accuracy and proper cooperation of the parts, facilitating assembly, improving the appearance and lessening the weight of the device and materially increasing its strength and durability.

Figure 2:
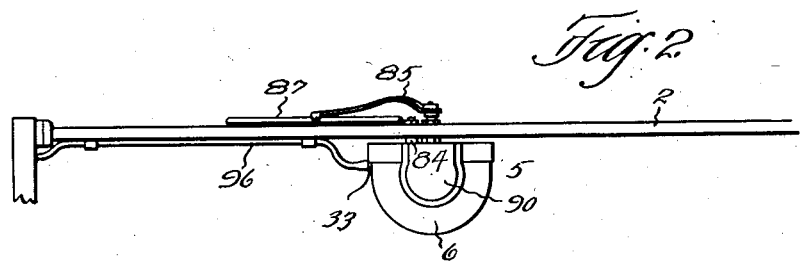
Figure 3:
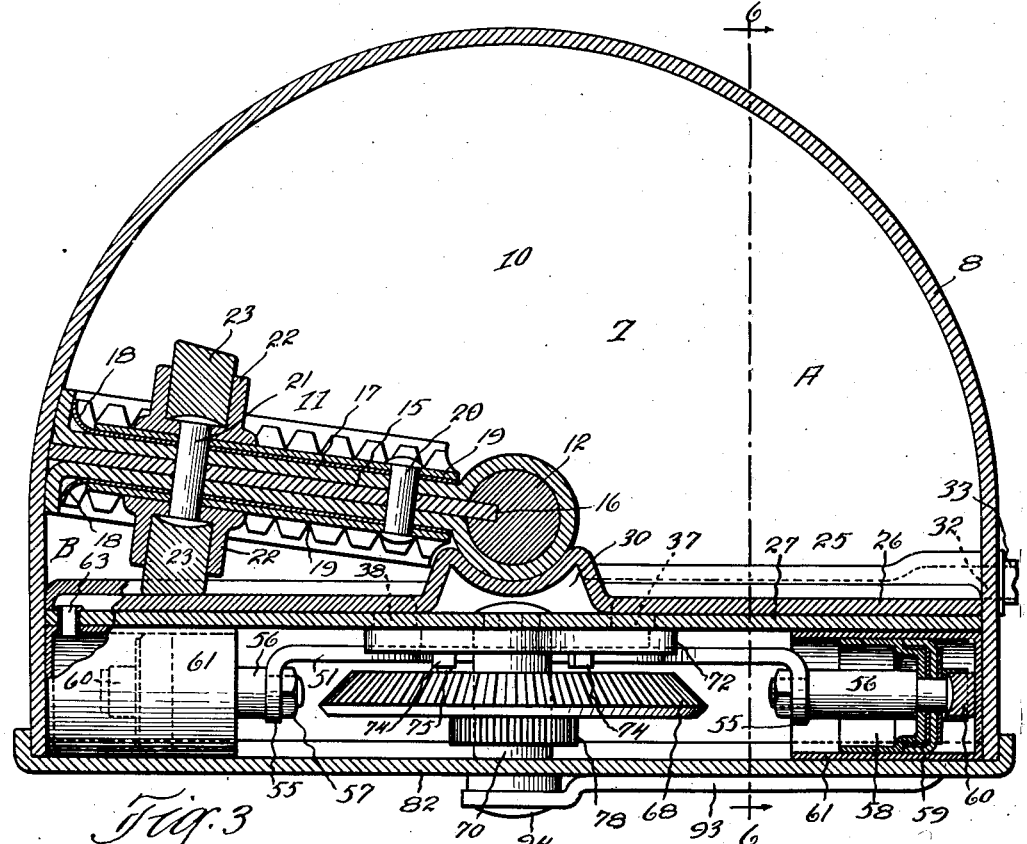
Figure 4:
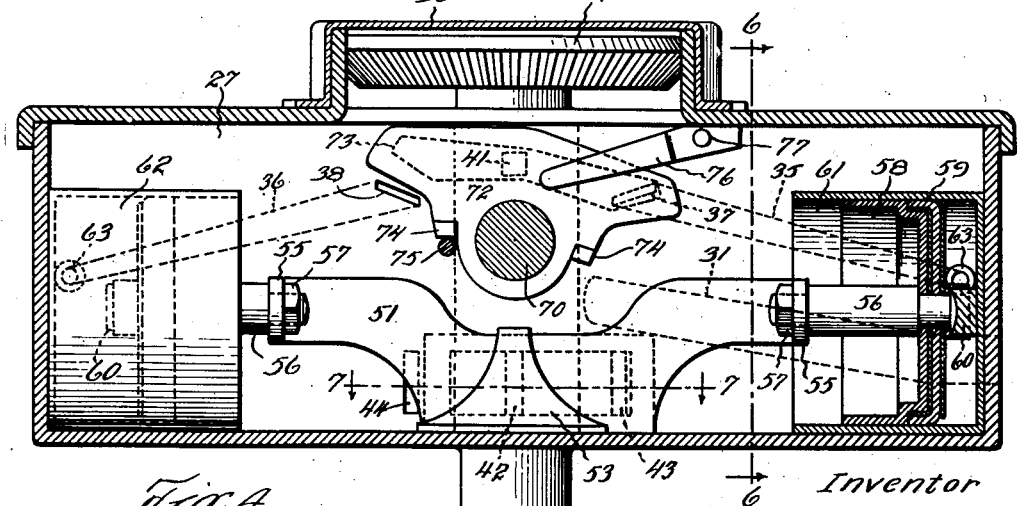

The foregoing very desirable results, with other objects hereinafter appearing, are attained in the construction illustrated in the drawings accompanying and forming a part hereof and wherein Fig. 1 is a fragmentary elevation of a windshield, as viewed from the driver's seat, and showing it equipped with the automatic windshield cleaner of my invention; Fig. 2 is a plan view of what is shown in Fig. 1; Fig. 3 is a sectional plan of the motor; Fig. 4 is a sectional front elevation of the same; Fig. 5 is a central vertical section from front to rear through the apparatus and adjacent portion of the windshield; Fig. 6 is a section on the lines 6—6 of Figs. 3 and 4; Fig. 7 is a sectional detail on the line 7—7 of Fig. 4; Fig. 8 is a fragmentary front view of the motor with the cleaner shaft and positioning stud in section; Fig. 9 shows, in perspective, a group of plates whereof the front partition of the operating chamber is composed; and Figs. 10 and 11 are similar views of the relay valve and main valve, respectively.

The pane of the windshield is designated 1, the frame thereof is designated 2, and the instrument board of the vehicle whereon the windshield is mounted is shown at 3 in Fig. 1.

The motor, which is designated generally by the numeral 5, comprises a casing made up of a top wall 6, a bottom wall 7 and a peripheral wall 8. The walls 6 and 7 are substantially parallel and have arcuate rear edges that are joined by the peripheral wall 8 thereby to enclose an operating chamber 10, wherein is located a vane or piston 11 that is secured to a shaft 12.

The vane is composed of a plate 15 which has its inner edge fitted within a groove 16 of the shaft 12 while its outer and lateral edges practically meet the peripheral wall 8 and respective top and bottom walls 6 and 7. A sheet 17 of suitable packing material, such as leather, has its central portion wrapped about the shaft 12 and is disposed along the opposite sides of the plate 15, the outer and lateral edges of said sheet flaring outwardly and lying against the walls of the casing. Applied to the opposite sides of the vane are spring leaves 18 that are held in place by clamping plates 19 secured together by rivets 20 and 21 which pass through the various elements whereof the vane is composed. The edges of the spring leaves 18 are formed to provide a plurality of tongues which bear upon the outwardly flared edge portions of the sheet 17 and serve to maintain the same in proper frictional engagement with the walls of the chamber 10. Except for minor differences, this vane or piston is disclosed and claimed in my copending application Serial No. 638,835, filed May 14, 1923. The rivet 21 serves the additional purpose of securing in place socket members 22 which contain bumpers 23 of leather or the like that are adapted to engage the front wall 25 of the chamber 10.

The wall 25 is composed of plates 26 and 27 that are shown in detail in Fig. 9. The central portion of the plate 26 is offset rearwardly and curved to form a saddle 28 that receives the wrapped shaft 12. Thus by means of the vane and shaft, the chamber 10 is divided into two fluid tight compartments A and B. The plates 26 and 27 are sweated, welded or othewise secured together and the offset central portion of the plate 26 provides, between it and adjacent portion of plate 27, a motive fluid chamber 30. The plate 26 is formed to provide a groove or channel 31 that opens at its inner end into the chamber 30 and joins at its outer end an opening 32 in the peripheral wall 8 of the casing and to which is applied a conduit connection 33. The plate 26 is also formed with passageways or channels 35 and 36 which register at their inner ends with slots 37 and 38 and at their outer ends with holes 39 and 40 in the plate 27. Intermediate the slots 37 and 38 the plate 27 is provided with an opening 41. At substantially the center of its lower edge the plate 27 has a port 42, and spaced laterally from said port, and in alignment therewith transversely of the plate, are ports 43 and 44 which register with like ports 43ª and 44ª in the plate 26. In other words, the ports 43 and 44 lead through the wall 25 into the compartments A and B, respectively. The bottom of the chamber 30 is closed by the bottom wall 7 of the casing 5 while the top of said chamber is adapted to be closed by a properly shaped plate 45 which is inserted within the upper end of the chamber between the plates 26 and 27. While the casing 5 may be formed in any suitable manner, according to the present construction the walls 7 and 8 are made integral while the wall 6 is applied to the top of wall 8 and secured thereto, as by soldering, so as to effect a fluid tight joint between said walls.

Slidably engaging the plate 27 in the region of the ports 42, 43 and 44 is a main valve 50 which is shown in perspective in Fig. 11. This valve is conveniently formed by applying to a metal stamping 51 a frame 52, the parts being secured together by suitable means, as by welding or sweating. To maintain the valve in constant contact with the plate 27, a finger 53 may be employed which is flanged forwardly at its lower end for attachment to the wall 7 and rearwardly at its upper end to overlie the middle portion of the valve 50. The plate 51 terminates at its ends in laterally turned portions 55 having apertures through which the reduced threaded ends of piston rods 56 are engaged and to which said portions are secured by nuts 57. Trunk pistons 58 are secured to the outer ends of the rods 56 and incorporate cups 59 of suitable packing material, all of which may be in accordance with common practice. Buffers 60 are carried by the pistons for engagement with the heads of cups or so-called cylinders 61 and 62 wherein the pistons operate. These cups are flattened for the sake of compactness although I shall refer to them as cylinders. The cylinders are preferably made from sheet metal and are connected to the plate 26 by hollow rivets or eyelets 63 which extend through the holes 39 and 40 of the plate 27 and thus establish communication between the cylinders and the respective passageways 35 and 36.

The lower end of the shaft 12 is journaled within a hollow boss 65 which is depressed from the bottom wall 7, and the upper end of the shaft is journaled within a boss 66 which is similarly formed from the top wall 6, and beyond the boss 66 the shaft has secured to it a bevel gear 67 which meshes with a similar gear 68 which is loosely mounted on a stud 70 that is secured at its inner end, as by riveting, to the plate 27.

Mounted for oscillation upon the stud 70 adjacent the plate 27 is what I shall term a relay valve 72 shown in detail in Fig. 10. This valve has a recess 73, and extending forwardly from the valve at diametrically opposite points with respect to its oscillating axis are abutments 74. The recess 73 is in constant communication with the chamber 30 through the opening 41 and the valve is adapted to be shifted, so as to bring the opposite ends of the recess 73 into register with the slots 37 and 38, by a pin 75 that is carried by the gear 68 when the gear is rotated in reverse directions as shall presently be explained. The relay valve is maintained adjacent the plate 27 by a finger 76 that is secured, as by a rivet 77, to said plate.

Fixed to the gear 68 is a spur gear 78 which meshes with a similar gear 79 on the inner end of a shaft 80 that is journaled within an externally threaded sleeve 81 which has its rear end clamped within an aperture of the wall 82 by nuts 83. The wall 82 constitutes the front of the casing and joins the bottom wall 7 and the peripheral wall 8 along their forward edges as will be seen from an inspection of Figs. 3 and 5, the wall 82 being secured to walls 7 and 8 by suitable means, as by screws, certain of which are designated 82ª in Fig. 8.

The sleeve 81 is adapted to be projected through a hole in the windshield frame 2 and to be clamped therein by a nut 83ª that is applied to its forward end. The sleeve 81 constitutes the only connection between the motor casing and the windshield frame, and the motor is held against turning by a positioning stud 84 which projects from the front wall 82 and enters a hole in the frame. The forward end of the shaft 80 is shown as tapered and knurled for the application of a wiper carrying arm 85 that is maintained rigidly in place upon the shaft by a nut 86 that is screwed onto the reduced threaded end of the shaft 80. A wiper 87, of usual construction, is connected at 88 to the arm 85 so that as the arm is swung from side to side it will move the wiper to and from across the windshield pane in contact with which the wiper is constantly maintained with the proper degree of pressure by the inherent resiliency of the arm 85.

A cap 90 houses the gear 87 and the other parts which project above the plane of wall 6 and at its forward end cooperates with the wall 82 and about its side and rear portions with the wall 6. The cap is shown as having an air admitting opening 91. For the purpose of lubricating all working parts of the motor, oil is introduced into the valve space forwardly of the partition wall 25, and in the operation of the motor a quantity of this oil finds its way into the operating chamber 10 on both sides of the vane 11 through ports 43 and 44.

Means for manually operating the cleaner is provided in the form of a handle 93 that is fastened to the forward end of a spindle 94 which is journaled within a bearing aperture in the lower portion of the wall 82 and carries a gear 95 at its rear end which meshes with the gear 78.

A suitable conduit 96 has one of its ends applied to the connection 33 of the motor and leads to the intake manifold of the internal combustion engine (not shown) by which the vehicle is propelled. A valve 97 is interposed between sections of the conduit and has its operating handle 98 exposed through the instrument board in convenient reach of the driver.

When the valve 97 is open, suction created within the intake manifold by the normal operation of the engine is communicated to the chamber 30 and, according to the position of the relay valve 72, to one or the other of the cylinders 61 and 62. As the parts are shown in Fig. 4, suction prevails within the cylinder 61 and as a consequence thereof the piston 58 has been retracted to move the main valve 50 to the right, thereby to throw the compartment A of the operating chamber 10 into communication with the chamber 30. This results in the vane 11 being moved to the right, atmospheric air being admitted to the compartment B through the port 44. As the vane swings within the casing it will rotate the gear 67 in a corresponding direction and the movement thereof is transmitted through the gears 68, 78 and 79 to the shaft 80 thereby to swing the wiper 87 across the windshield pane. Obviously the movement of the wiper is limited by that of the vane, and the vane is arrested in its movement by the engagement of one of the bumpers 23 with the wall 25. While this operation is taking place the pin 75, that is carried by the gear 68, travels to the right (as viewed in Fig. 4) and engages the corresponding abutment 74 of the relay valve, reversing the position of said valve and establishing communication between the chamber 30 and the cylinder 62, at the same time throwing the cylinder 61 open to the atmosphere. When this takes place, the piston within the cylinder 62 is retracted and the main valve 50 slid to its left hand position whereupon communication is established between the chamber 30 and the compartment B, while compartment A is thrown open to the atmosphere through the port 43. This will result in the returning of the vane 11 to its former position wherein it is stopped by the engagement of the other bumper 23 with the wall 25 and the wiper 87 will be swung in the opposite direction across the pane.

The motor will continue to operate as above described so long as the valve 97 remains open, and the speed of the motor may be regulated by the adjustment of the valve. It is apparent from the foregoing description that the action of the motor is positive at every phase of its operation and that a "dead center" condition is impossible of occurrence.

If for any reason it is desirable to operate the cleaner by hand, as occasionally in a very light rain, the same may be accomplished by means of the handle 23, the motion whereof is transmitted through the gears 95, 78 and 79 to the shaft 80 and thence to the arm 85 of the cleaner 87.

Having thus described my invention, what I claim is:—

1. In a motor of the class described, the combination of a casing, a partition dividing the same into an operating chamber and a valve space, a vane mounted to oscillate within the operating chamber and dividing the same into two compartments, the casing enclosing a pressure fluid chamber adjacent said partition, the partition having a main port leading into the pressure fluid chamber and ports spaced laterally therefrom leading into the respective compartments of the operating chamber, a main valve cooperating with said ports and by means of which when it is moved in opposite directions said compartments are, in alteration, placed in communication with the pressure fluid chamber, pressure fluid means for operating the main valve, the partition having passageways leading to the pressure fluid means and a second port opening into the pressure fluid chamber, a relay valve through which said passageways are, in alteration, placed in communication with the pressure fluid chamber, and operative connections between the vane and the relay valve.

2. In a motor of the class described, the combination of a casing, a partition dividing the same into an operating chamber and a valve space, a vane mounted to oscillate within the operating chamber and dividing the same into two compartments, the vane having a shaft extending through one of the casing walls, the casing enclosing a pressure fluid chamber adjacent the partition, the partition having a main port opening into the pressure fluid chamber and ports spaced laterally therefrom in opposite directions which open respectively into said compartments, a main valve slidably engaging the partition and cooperating with said ports so that when said valve is moved in opposite directions it will establish communication between the pressure fluid chamber and first one and then the other of said compartments pressure fluid means for moving the main valve, the partition having passageways leading to said pressure fluid means, the partition having also a second port opening into the pressure fluid chamber, a gear member rotatably supported within the valve space on an axis at substantially right angles to that of the aforesaid shaft, a gear member mounted upon the aforesaid shaft and cooperating with the first mentioned gear member, a relay valve supported for oscillation upon the axis of the first mentioned gear member and adapted when moved in opposite directions to establish communication between first one and then the other of said passageways and the second mentioned port, and means through which the first mentioned gear member, when oscillated, will move the relay valve in opposite directions.

3. In a motor of the class described, the combination of a casing, a partition dividing the same into an operating chamber and a valve space, a vane mounted to oscillate within the operating chamber and dividing the same into two compartments, the vane having a shaft extending through one of the casing walls, the casing enclosing a pressure fluid chamber adjacent the partition, the partition having a main port opening into the pressure fluid chamber, and ports spaced laterally therefrom in opposite directions which open respectively into said compartments, a main valve slidably engaging the partition and cooperating with said ports so that when said valve is moved in opposite directions it will establish communication between the pressure fluid chamber and first one and then the other of said compartments, pressure fluid means for moving the main valve, the partition having passageways leading to said pressure fluid means, the partition having also a second port opening into the pressure fluid chamber, a gear member rotatably supported within the valve space on an axis at substantially right angles to that of the aforesaid shaft, a gear member mounted upon the aforesaid shaft and cooperating with the first mentioned gear member, a relay valve supported for oscillation upon the axis of the first mentioned gear member and adapted when moved in opposite directions to establish communication between first one and then the other of said passageways and the second mentioned port, means through which the first mentioned gear member, when oscillated, will move the relay valve in opposite directions, a bearing in the casing above the axis of the first mentioned gear member, a shaft journaled within said bearing, and driving connections between the first mentioned gear member and said shaft.

4. In a motor of the class described, the combination of a casing, a partition dividing the same into an operating chamber and a valve space, a vane mounted for oscillation within the operating chamber and dividing the same into two compartments, a shaft to which said vane is secured, said shaft extending through one of the casing walls, the casing having a main port and ports leading into the respective compartments, valve mechanism within the valve space for establishing communication between the main port and one or the other of the second mentioned ports, a gear member mounted for oscillation within the valve space on an axis at substantially right angles to the said partition, operative connections between said gear member and the valve mechanism, a second gear member secured to the aforesaid shaft and meshing with the first mentioned gear member, a second shaft supported for oscillation by the casing substantially parallel with the axis of the first mentioned gear member, and driving connection between said first mentioned gear member and the last mentioned shaft.

5. In a motor of the class described, the combination of a casing, a partition dividing the same into an operating chamber and a valve space, a vane mounted for oscillation within the operating chamber and dividing the same into two compartments, a shaft to which the vane is secured and one end of which projects through a wall of the casing, the casing enclosing a pressure fluid chamber adjacent the aforesaid partition, the partition having a main port opening into the pressure fluid chamber and ports spaced laterally therefrom in opposite directions which open respectively into said compartments, a main valve cooperating with said ports and serving, when moved in opposite directions, to establish communication between the main port and first one and then the other of said compartments, cylinders within the valve space, a piston within each cylinder, operative connections between the pistons and the main valve, the partition having passageways leading to the respective cylinders, the partition having a second port opening into the pressure fluid chamber, a relay valve for establishing communication between the second port and first one and then the other of the passageways, and operative connections between the aforesaid shaft and the relay valve.

6. In a motor of the class described, the combination of a casing, a partition dividing the same into an operating chamber and a valve space, a vane mounted for oscillation within the operating chamber and dividing the same into two compartments, a shaft to which said vane is secured, said shaft extending through one of the casing walls, the casing having a main port and ports leading into the respective compartments, valve mechanism within the valve space for establishing communication between the main port and one or the other of the second mentioned ports, a gear member mounted for oscillation within the valve space on an axis at substantially right angles to the said partition, operative connections between said gear member and the valve mechanism, and a second gear member secured to the aforesaid shaft and meshing with the first mentioned gear member.

7. In a motor of the class described, the combination of a casing, a partition dividing the same into an operating chamber and a valve space, a vane mounted for oscillation within the operating chamber and dividing the same into two compartments, a shaft to which said vane is secured, said shaft extending through one of the casing walls, the casing having a main port and ports leading into the respective compartments, valve mechanism within the valve space for establishing communication between the main port and one or the other of the second mentioned ports, a gear member mounted for oscillation within the valve space on an axis at substantially right angles to the said partition, operative connections between said gear member and the valve mechanism, a second gear member secured to the aforesaid shaft and meshing with the first mentioned gear member, a second shaft supported for oscillation by the casing substantially parallel with the axis of the first mentioned gear member, and driving connection between said first mentioned gear member and the last mentioned shaft, a wiper carrying member having operative connection with the last mentioned shaft.

8. In a motor of the character set forth, a casing, a partition wall dividing the casing into an operating chamber and a valve space, said partition consisting of two plates arranged one beside the other, one of said plates being flat and having a plurality of openings, the second plate having depressed channels through which certain of said openings communicate, a valve movably engaging the first plate and controlling certain of the openings therein, and a member movable within the operating chamber.

9. A motor of the character set forth comprising a casing, a partition dividing the casing into an operating chamber and a valve space, said partition consisting of two plates arranged one against the other, one of said plates having an offset portion providing between it and the adjacent portion of the other plate a motive fluid chamber, one of said plates having a depressed channel through which motive fluid is conducted to the last mentioned chamber, one of said plates having a port opening into the motive fluid chamber and having with the other plate ports which open into the operating chamber, a valve through which the last mentioned ports are alternately thrown into communication with the first mentioned port, a member adapted to be moved back and forth within the operating chamber by the motive fluid admitted through the aforesaid ports, and means through which said valve is controlled by the aforesaid member.

10. A motor of the character set forth comprising a casing having opposed walls provided with bearings, a shaft journaled within said bearings and projecting beyond one of them, the casing being of arcuate formation and concentric with respect to the axis of the shaft, a vane secured to the shaft and operating within the casing, a partition wall dividing said casing into an operating chamber and a valve space, the vane being located within and dividing the operating chamber into two compartments, said partition wall being composed of two plates arranged one beside the other, the plate adjacent the operating chamber having a depressed portion formed to cooperate with the shaft and to provide between itself and the other plate a motive fluid chamber, said plate having also depressed passageways through one of which motive fluid is supplied to said chamber, the other of said plates having two ports which lead into the motive fluid chamber, and openings which communicate through others of said passageways, pneumatics within the valve space which have communicative connection with the last mentioned passageways, a relay valve for establishing communication alternately between one of the first mentioned ports and two of the aforesaid openings which lead, respectively, to the said pneumatics, a main valve cooperating with the other of the first mentioned ports and having operative connection with the pneumatics whereby said pneumatics move it alternately in opposite directions, the partition wall having ports which lead into the compartments of the operating chamber and which are alternately thrown into communication with the second of said first mentioned ports by the operation of the main valve, a stud within the valve space adjacent the partition wall, the relay valve being movably supported adjacent said stud, a gear member upon said stud, a gear member upon the projecting end of the aforesaid shaft and wherewith the former gear member meshes, and means carried by the first gear member for actuating the relay valve.

In testimony whereof, I hereunto affix my signature.

SAMUEL LIPPERT.